US012691871B2

(12) United States Patent
Clawson et al.

(10) Patent No.: US 12,691,871 B2
(45) Date of Patent: Jul. 28, 2026

(54) SYSTEMS AND METHODS FOR DETERMINING BUFFER REGIONS

(71) Applicant: Zoox, Inc., Foster City, CA (US)

(72) Inventors: Taylor Scott Clawson, Castro Valley, CA (US); Leonardo Poubel Orenstein, Foster City, CA (US); Giacomo Zavolta Taylor, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 242 days.

(21) Appl. No.: 17/661,391

(22) Filed: Apr. 29, 2022

(65) Prior Publication Data

US 2023/0347880 A1    Nov. 2, 2023

(51) Int. Cl.
*B60W 30/095* (2012.01)
*G06V 20/58* (2022.01)

(52) U.S. Cl.
CPC ........... *B60W 30/095* (2013.01); *G06V 20/58* (2022.01); *B60W 2420/403* (2013.01); *B60W 2554/4045* (2020.02); *B60W 2554/4049* (2020.02)

(58) Field of Classification Search
None
See application file for complete search history.

(56) References Cited

U.S. PATENT DOCUMENTS

| | | | | |
|---|---|---|---|---|
| 11,079,764 B2 * | 8/2021 | Nister | ................. | G05D 1/0242 |
| 11,136,025 B2 * | 10/2021 | Li | ........................ | G05D 1/0212 |
| 11,260,857 B2 * | 3/2022 | Li | ........................... | G05D 1/646 |
| 11,584,371 B2 * | 2/2023 | Baric | ................. | B60W 60/001 |
| 11,970,185 B2 * | 4/2024 | Nichols | ............. | B60W 60/001 |
| 2019/0243371 A1 | 8/2019 | Nister et al. | | |
| 2021/0261118 A1 | 8/2021 | Xu et al. | | |
| 2021/0261122 A1 | 8/2021 | Packer et al. | | |
| 2022/0017086 A1 | 1/2022 | Baric et al. | | |

FOREIGN PATENT DOCUMENTS

WO    WO2021/016752 A1    2/2021

OTHER PUBLICATIONS

The PCT Search Report and Written Opinion mailed Aug. 2, 2023 for PCT application No. PCT/US23/66172, 9 pages.

* cited by examiner

*Primary Examiner* — Angela Y Ortiz
*Assistant Examiner* — Torrence S Marunda, II
(74) *Attorney, Agent, or Firm* — Lee & Hayes, P.C.

(57) ABSTRACT

Systems and techniques for determining a buffer region for use in controlling a vehicle and avoiding collisions are disclosed herein. A predicted region of travel of a vehicle front bumper may be determined. The position of the front bumper may be determined at points along a center curve of the predicted region of travel and polygons may be determined for the positions. The polygons may be joined and modified using a convex shape-based algorithm to determine a convex polygonal buffer region that is used in collision detection.

19 Claims, 6 Drawing Sheets

100

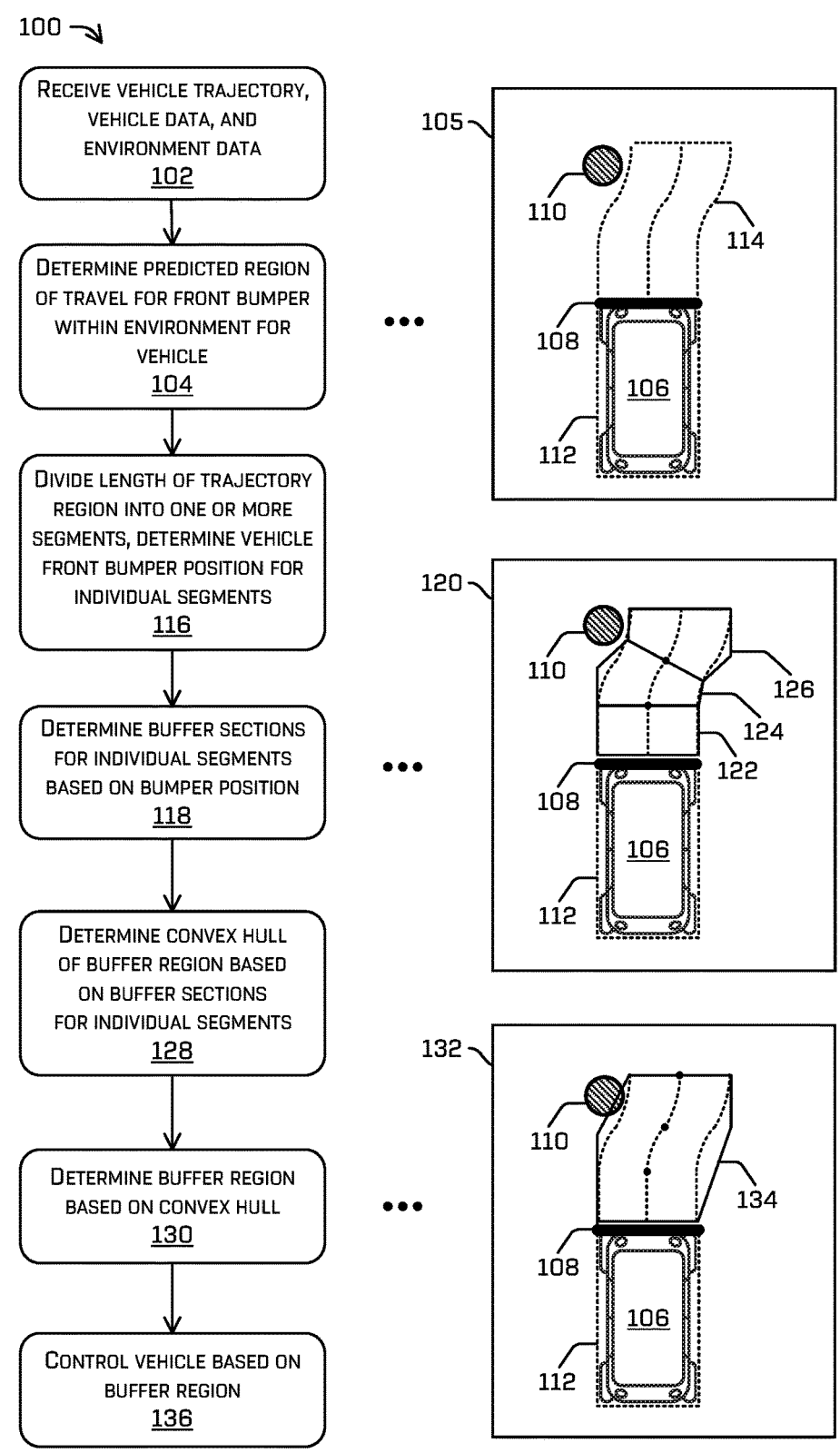

RECEIVE VEHICLE TRAJECTORY, VEHICLE DATA, AND ENVIRONMENT DATA
102

DETERMINE PREDICTED REGION OF TRAVEL FOR FRONT BUMPER WITHIN ENVIRONMENT FOR VEHICLE
104

DIVIDE LENGTH OF TRAJECTORY REGION INTO ONE OR MORE SEGMENTS, DETERMINE VEHICLE FRONT BUMPER POSITION FOR INDIVIDUAL SEGMENTS
116

DETERMINE BUFFER SECTIONS FOR INDIVIDUAL SEGMENTS BASED ON BUMPER POSITION
118

DETERMINE CONVEX HULL OF BUFFER REGION BASED ON BUFFER SECTIONS FOR INDIVIDUAL SEGMENTS
128

DETERMINE BUFFER REGION BASED ON CONVEX HULL
130

CONTROL VEHICLE BASED ON BUFFER REGION
136

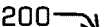
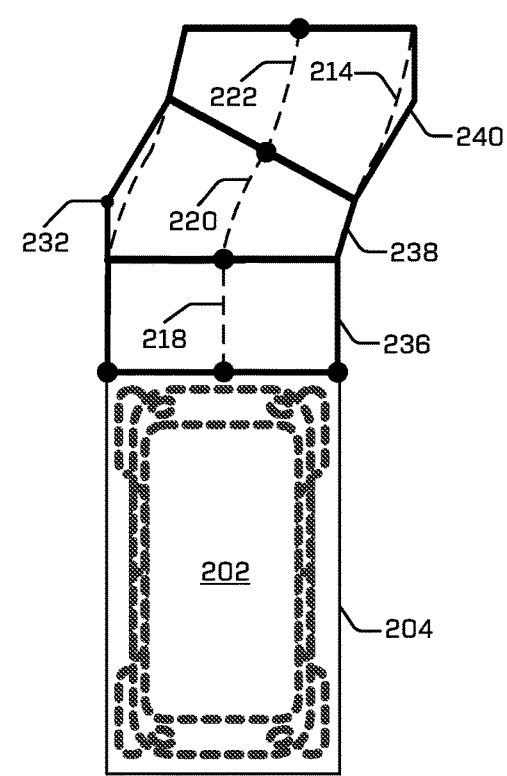
FIG. 2C
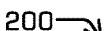
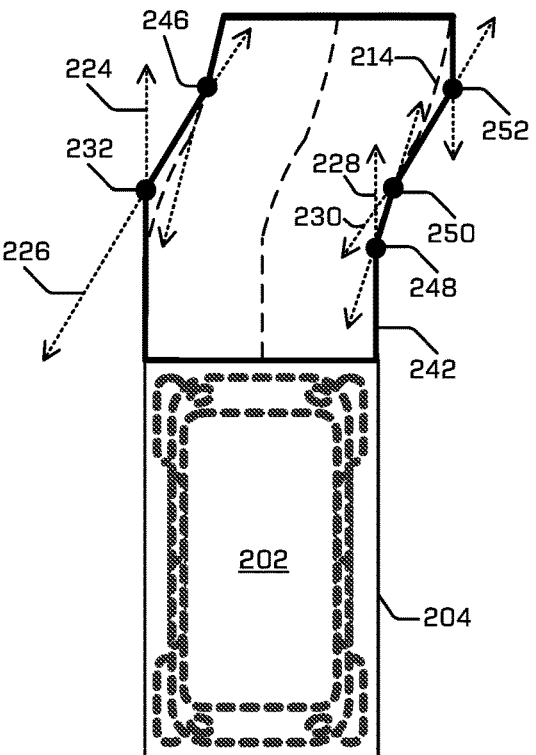
FIG. 2D

200

300 ⤸

310 ⤸

SYSTEMS AND METHODS FOR DETERMINING BUFFER REGIONS

BACKGROUND

Vehicles may be equipped with subsystems used to detect objects in an environment and control the vehicle to avoid the objects. Vehicles may also be equipped with a trajectory planning system that determines a trajectory for the vehicle. Such systems and subsystems may detect, or use data associated with detections of, both stationary objects, such as parked vehicles and road obstructions, and moving objects, such as other vehicles, cyclists, pedestrians, and animals. For example, some such systems operate by detecting and identifying the presence of a surface in the environment representing an object in the path of the vehicle, and then engaging, or planning for the engagement of, the braking and/or steering systems of the vehicle to avoid colliding with the surface.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 1 illustrates an example process for determining a convex polygonal buffer region, in accordance with examples of the disclosure.

FIGS. 2A-E depict block diagrams representing an example vehicle, environment, regions, and data points that may be used for determining a convex polygonal buffer region, in accordance with examples of the disclosure.

DETAILED DESCRIPTION

Figure 2A:
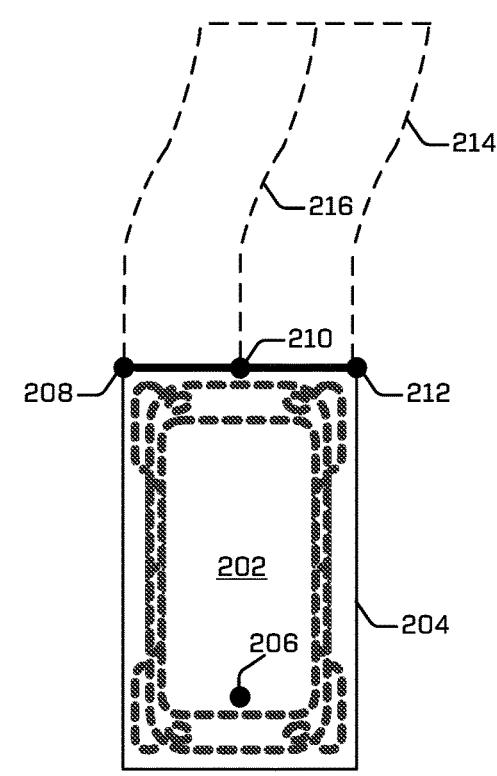

Systems and techniques for determining a buffer for use in systems that may detect objects in an environment and facilitate the avoidance of such objects are discussed herein. For example, techniques may include determining a convex polygonal buffer region for a vehicle based on one or more polygons associated with a predicted region of travel of a vehicle's bumper through an environment. The determined convex polygonal buffer may be used while controlling the vehicle along a trajectory to perform object detection within the region of travel that the front of the vehicle (e.g., the front bumpers) will traverse and to perform more efficient collision avoidance operations. For example, at a particular point along a trajectory, the convex polygonal buffer may be used to define a region in which to detect objects within the likely region of travel of vehicle and to determine whether to perform stopping operations based on a detection of an object within that region of travel. Because there may be uncertainty in determining the distance required to stop a vehicle and/or the path that a vehicle may actually take when following a trajectory (e.g., due to environmental conditions, vehicle equipment, velocity, trajectory error, etc.), the convex polygonal buffer may provide a buffer region for detecting objects within the region of the environment that the vehicle (e.g., the front bumper) will most likely travel. By repeatedly determining such a buffer for one or more points along the trajectory and/or by determining a such a buffer for a region of the environment that is beyond a stopping point if the vehicle's trajectory, the systems and techniques described herein increase the accuracy and efficiency of performing object detection and collision avoidance operations.

In various examples, a trajectory for a vehicle (e.g., an autonomous vehicle) may be determined based on data of various types (e.g., sensor data, object detections, maps, destination, route, etc.). This trajectory may be determined based at least in part on detection of objects in the environment in which the vehicle is traveling and, in some examples, predicted trajectories of moving objects in the environment. A vehicle computing system may determine, based on a vehicle's trajectory, a predicted region of travel for the vehicle representing a portion of the environment predicted to be traversed by a front bumper of a vehicle. The vehicle computing system may determine a predicted position of the vehicle's front bumper based on the vehicle's trajectory and its position in the environment (e.g., represented as the position of the center of the vehicle's rear axle, the position of the center of the vehicle's front axle, etc.). In examples, the predicted bumper position may be determined using one or more parameters representing a position of an outside front corner of the vehicle and/or a bounding box associated therewith, as described in more detail herein.

A longitudinal center length of this predicted region of travel may be determined dynamically based on one or more of various criteria, such as vehicle speed, remaining trajectory length, etc. For example, an acceleration profile may be determined based on various factors such as current vehicle velocity, predicted vehicle velocity (e.g., based on the trajectory and/or environmental factors), current vehicle weight (e.g., vehicle weight plus the weight of passengers and cargo), etc. Alternatively, a length for the predicted region of travel of the environment may be a fixed and/or preconfigured length (e.g., that may remain constant regardless of vehicle speed, remaining trajectory, etc.). The center length of the predicted region of travel, or a subset thereof, may also be used as a length of a convex polygonal buffer region that encompasses the predicted region of travel and that may be determined by the vehicle computing system. The center length of the predicted region of travel and/or the length of the convex polygonal buffer region may also, or instead, be determined based on a vehicle stopping distance (e.g., determined based on a trajectory and/or collision avoidance operation(s)), vehicle braking capabilities, vehicle velocity, vehicle direction, detected object parameters, and/or other parameters that may be associated with a vehicle that may be controlled along a trajectory in an environment that may contain one or more objects.

A vehicle computing system may divide the center curve (which may include one or more lines, arcs, or any combination thereof, and may be referred to as an arc-length) of the predicted region of travel into one or more segments. The vehicle computing system may then determine a predicted position of the vehicle's front bumper for the individual segments. For example, the vehicle computing system may determine the predicted bumper position at the farthest end of segment from the vehicle (e.g., based on data used to determine the predicted region of travel and/or based on one or more parameters as descried herein). Using the predicted bumper positions for the one or more segments, one or more buffer section polygons (e.g., pentagons) may be determined for the individual segments.

In examples, the one or more polygons may be determined based on vectors associated with the individual endpoints of the predicted bumper positions, where such vectors may be tangent to the predicted region of travel and/or perpendicular to the bumper at the respective predicted bumper position (e.g., for a respective segment). Where such vectors extend outward from the predicted region of travel, the intersection of such vectors may serve as a vertex of the associated polygon. Where such vectors extend inward toward the predicted region of travel, a single edge extending between the endpoints of the associated predicted bumper positions may be used at that side of the associated polygon. As will be appreciated, because vectors associated with opposite endpoints of a particular predicted bumper position may extend in opposite directions, the resulting polygons may be a pentagon. For example, when a vector at one endpoint tangent to the predicted region of travel extends inwards towards the predicted region of travel, the vector at the opposite endpoint tangent to the predicted region of travel is likely to extend outwards from the predicted region of travel.

A vehicle computing system may determine a convex polygonal buffer region based on the one or more polygons determined based on vectors associated with the individual endpoints of one or more predicted bumper positions. In various examples, the one or more polygons may be "convexified" to determine this convex polygonal buffer region. This convexifying operation may include determining a union of the one or more polygons to determine a resulting convex polygon that may be a polygon having interior angles that are all less than or equal to 180 degrees. This convex polygon may be used as the perimeter of the convex polygonal buffer region. For example, an aggregated polygon may be determined based on joining the one or more polygons together (e.g., based on a union of such polygons). The edges associated with the individual vertices of this aggregated polygon may be evaluated to determine whether the edges extend inwards or outwards from the predicted region of travel. Individual vertices associated with edges that extend outwards from the predicted region of travel may be eliminated while individual vertices that extend inwards towards the predicted region of travel may be retained. The vehicle computing system may join the remaining vertices with edges to define a convex polygonal buffer region. In this way the entirety of the predicted region of travel may be captured within the resulting convex polygonal buffer region while a minimal number of edges may be required, thereby increasing the efficiency of processing such buffer regions. The vehicle computing system may use the determined convex polygonal buffer region to detect objects in an environment and/or control the vehicle to avoid such objects.

In examples, the vehicle computing system may determine one or more convex polygonal buffer regions as a vehicle travels along a trajectory to facilitate the detection of objects within the vehicle's predicted region of travel. Alternatively, or in addition, the vehicle computing system may include one or more convex polygonal buffer regions in performing collision avoidance operations (e.g., in response to detecting an obstacle) to configure the vehicle to avoid colliding with a detected object that may be within a convex polygonal buffer region. In other words, the vehicle computing system may control the vehicle to initiate stopping or maneuvering actions such that the vehicle may avoid colliding with an obstacle detected within a convex polygonal buffer region.

In examples, the determined convex polygonal buffer regions may extend beyond a predicted stopping point for the vehicle so that objects beyond the stopping point may be detected and avoided in the event that there are any problems that arise during stopping actions. Such problems may include braking system malfunction, environmental issues (slick or slippery road), and any other unexpected issues that may arise during a vehicle stopping maneuver. Such regions may be determined beyond a stopping point by assuming a continuous trajectory with a constant curvature beyond the stopping point to determine one or more convex polygonal buffer regions that may be used in object detection and collision avoidance operations.

In various examples, the vehicle computing system may perform the convex polygonal buffer region determination operations disclosed herein repeatedly to substantially continuously determine such a buffer region. For example, such regions may be determined substantially continuously and/or incrementally at particular points along a trajectory (e.g., at time and/or distance increments). By using a sequence of buffers that capture the entirety of a region of predicted travel and extend beyond the path of predicted travel, the systems and techniques described herein may increase the safety of operating a vehicle in an environment.

The systems and techniques described herein may be directed to leveraging object detection data and vehicle localization data to enable a vehicle, such as an autonomous vehicle, to more accurately determine a buffer region that may in turn be used for improved object detection and collision avoidance operations, facilitating safer navigation through an environment and improved vehicle control in the event that an obstacle is detected. In particular examples, the systems and techniques described herein can utilize data structures containing data representing a predicted region of travel, predicted positions of a vehicle bumper and/or any other portion of a vehicle, and/or polygon vertices and edges associated with a predicted region of travel and/or predicted positions of a vehicle bumper and/or any other portion of a vehicle. By using the convex polygonal buffer region determination techniques described herein to more accurately determine a collision avoidance buffer, the examples described herein may result in increased safety and accuracy of vehicle control, especially vehicle stopping operations in potentially hazardous situations, thereby allowing an autonomous vehicle to more safely operate in an environment.

For example, the techniques described herein may be faster and/or more robust than conventional techniques, as they may increase the ability of an autonomous vehicle to safely navigate in an environment and avoid collisions with objects in the environment, reducing the likelihood of a collision. That is, techniques described herein provide a technological improvement over existing collision avoidance technology. The techniques described herein may also improve the operation of computing systems and increase resource utilization efficiency. For example, computing systems, such as vehicle computing systems, may more efficiently perform buffer determinations using the techniques described herein because the disclosed examples may reduce the amount of data needed to represent a buffer and a predicted region of travel and the calculations required to determine a buffer and a predicted regions of travel by reducing such data to, for example, representations of vertices and vectors, thereby requiring the processing of fewer buffer data points and/or associated data than would be required using conventional techniques. Furthermore, computing systems, such as vehicle computing systems, may more efficiently perform object detections and collision avoidance operations by performing less complex coarse object detections using the techniques described herein before performing more computationally intensive fine object detections, thereby reducing the data processing required in many circumstances to determine whether collision avoidance operations may be performed.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein can be applied to semi-autonomous and/or manually operated vehicle. In another example, the techniques can be utilized in an aviation or nautical context, or in any system involving vehicle or object trajectories and/or collision avoidance operations. Further, although discussed in the context of originating with particular types of sensor data and processing with particular types of components, data and data structures as described herein can include any two-dimensional, three-dimensional, or multi-dimensional data and data associated with any other types of sensors (e.g., cameras, lidar, radar, sonar, time-of-flight, and the like). Additionally, the techniques described herein can be used with real data (e.g., captured using sensor(s)), simulated data (e.g., generated by a simulator, training data, and the like) or any combination of the two.

Figure 4:
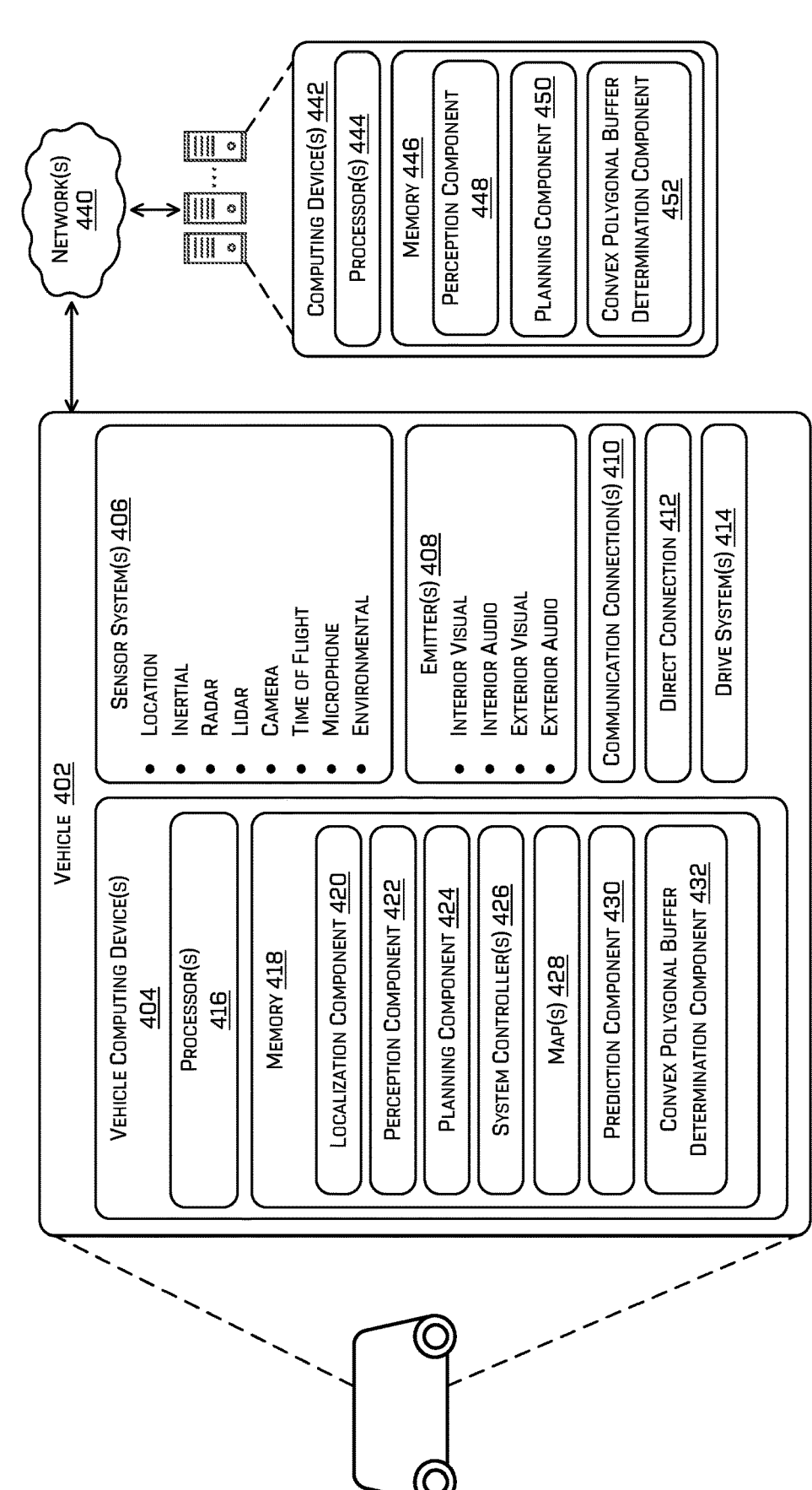
FIG. 4 depicts a block diagram of an example system for implementing the techniques described herein.

FIG. 1 is a pictorial flow diagram of an example process 100 for determining a convex polygonal buffer region. In examples, one or more operations of the process 100 may be implemented by a vehicle computing system, such as by using one or more of the components and systems illustrated in FIG. 4 and described below. For example, one or more components and systems can include those associated with convex polygonal buffer determination component(s) 432 illustrated in FIG. 4. In examples, the one or more operations of the process 100 may be performed by a remote system in communication with a vehicle, such as convex polygonal buffer determination component(s) 452 illustrated in FIG. 4. In still other examples, the one or more operations of the process 100 may be performed by a combination of a remote system and a vehicle computing systems. However, the process 100 is not limited to being performed by such components and systems, and the components and systems of FIG. 4 are not limited to performing the process 100.

At operation 102, a vehicle computing system may receive (e.g., from a perception component) and/or determine a trajectory for a vehicle (e.g., an autonomous vehicle) and/or other data associated with the vehicle and/or the environment in which the vehicle may be traveling. Such data may include sensor data, object detections, maps, a destination, a route, etc. In various examples, the data received may include a vehicle bounding box representing the position of the vehicle in the environment and/or other localization data associated with the vehicle in the environment. The received or determined trajectory may be based at least in part on detection of objects in the environment in which the vehicle is traveling and, in some examples, predicted trajectories of moving objects in the environment.

At operation 104, the vehicle computing system may determine, based on a vehicle's trajectory and vehicle data, a predicted region of travel for the vehicle. This predicted region of travel may represent a portion of the environment predicted to be traversed by a front bumper of a vehicle. For example, the vehicle computing system may determine a predicted position of the vehicle's front bumper over time based on the trajectory, an outside front corner of a bounding box representing the vehicle, and the position of the center of the vehicle's rear axle as representing in the bounding box. An example process for determining a predicted position of the vehicle's front bumper is described in more detail herein, including in regard to FIGS. 2A-E.

An example 105 illustrates a vehicle 106 that may be located in an environment and that may be configured with and/or in communication with a vehicle computing system. The vehicle 106 may have a front bumper 108 (exaggerated in this figure for clarity). An object 110 may be configured within the environment of the example 105. The vehicle computing system of the vehicle 106 may receive and/or determine a trajectory that, for example, navigates the vehicle 106 around the obstacle 110. The vehicle computing system of the vehicle 106 may also, or instead, receive and/or determine vehicle data such as a vehicle bounding box 112 representing the vehicle 106's position in the environment.

Using this data and the trajectory, the vehicle computing system may determine a predicted region of travel 114 for the vehicle 106. The predicted region of travel 114 may represent the predicted position of the front bumper 108 of the vehicle 106 over time and/or at particular points along the trajectory as the vehicle traverses the trajectory. As described in more detail herein, the vehicle computing system may determine the predicted region of travel 114 based on the predicted position of the vehicle 106's front bumper 108 over time based on a parameter representing a position of an outside front corner of the vehicle bounding box 112 (e.g., assumed to represent an endpoint of the bumper 108) and a parameter representing a position of the center of the vehicle's rear axle.

The vehicle computing system may determine the predicted region of travel 114 for a particular length. In various examples, a length of longitudinal center curve of the predicted region of travel 114 may be determined dynamically (e.g., based on one or more criteria, such as vehicle speed, remaining trajectory length, maximum braking deceleration, etc.) or may be preconfigured. This length may remain constant for repeated convex polygonal buffer region determinations and/or may change across convex polygonal buffer region determinations. For example, the length of the predicted region of travel 114 may be adjusted to be shorter or longer based on vehicle speed, remaining trajectory distance, maximum braking deceleration, etc.

At operation 116, the vehicle computing system may divide the longitudinal center of the predicted region of travel 114 into one or more segments. In various examples, the individual segments may be the same length, though this is not meant to be so limiting (e.g., spacing may be non-linear, having disproportionate lengths closer and/or further from a current position). The number of segments may be any number, and in some examples, is a relatively small number (e.g., 2, 3, 4, etc.) to increase computational efficiency. For example, the vehicle computing system may divide the center curve of the predicted region of travel 114 into three segments of equal length.

Further at operation 116, the vehicle computing system may determine a predicted position of the vehicle 106's front bumper 108 for the individual segments of the center curve. For example, the vehicle computing system may determine the predicted bumper positions at the "top," or farthest endpoint of the individual segments from the vehicle.

At operation 118, the vehicle computing system may use the predicted bumper positions for the one or more segments to determine one or more buffer section polygons (e.g., pentagons) for the individual segments. In examples, such as those described in more detail in regard to FIGS. 2A-E, these buffer sections may be determined based on vectors associated with the endpoints of the predicted bumper positions, where such lines may be tangent to the predicted region of travel and/or perpendicular to the bumper at the respective predicted bumper position (e.g., for a respective segment). As described herein, if such vectors extend outwards from the predicted region of travel, the intersection of such vectors may serve as a vertex of the associated polygon, while such vectors that extend inwards toward the predicted region of travel may be replaced by a single line extending between neighboring endpoints of the associated predicted bumper positions associated with those vectors.

An example 120 illustrates the polygonal buffer sections 122, 124, and 126 that may be determined by the vehicle computing system of the vehicle 106. As shown in this example, the center curve of the predicted region of travel 114 may be divided into three segments. A predicted position of the bumper 108 at the top of each segment may be determined. The (e.g., tangent or perpendicular) vectors at the endpoints of the bumper 108 at the predicted positions may be used to determine edges of polygons for the individual segments, in turn determining the polygonal buffer sections 122, 124, and 126.

At operation 128, the vehicle computing system may determine a hull for a convex polygonal buffer region based on the one or more polygons determined at operation 118. In various examples, the one or more polygons determined at operation 118 may be combined and convexified by eliminating individual vertices associated with outside edges that extend outwards from the predicted region of travel while retaining individual vertices associated with outside edges that extend inwards towards the predicted region of travel. At operation 130, the vehicle computing system may determine the convex polygonal buffer region based on the hull determined at operation 128.

An example 132 illustrates the convex polygonal buffer region 134 that may be determined by the vehicle computing system of the vehicle 106. As shown in this example, in determining the convex polygonal buffer region 134, the vehicle computing system has eliminated the vertices associated with outside edges of the polygonal buffer sections 122, 124, and 126 that extended outwards from the predicted region of travel 114 and retained the vertices associated with outside edges of the polygonal buffer sections 122, 124, and 126 that extended inwards from the predicted region of travel 114 to determine the hull of the convex polygonal buffer region 134. The vehicle computing system of the vehicle 106 then used the hull to determine the convex polygonal buffer region 134 for use as a trajectory and/or collision avoidance buffer as described herein.

As shown in this example, because the convex polygonal buffer region 134 encompasses the predicted region of travel 114 and may capture area outside the region of travel, the object 110 may be detected within the convex polygonal buffer region 134 (e.g., by performing coarse object detection operations). In this case, the vehicle computing system may the perform fine object detection operations, for example using an intermediate polygon based on the polygonal buffer sections 122, 124, and 126, to determine whether the object 110 is within a more accurately determined predicted region of travel for the vehicle 106, as described in more detail herein.

At operation 136, the vehicle computing system may use the convex polygonal buffer region determined at operation 130 to control a vehicle in an environment. For example, the vehicle computing system may detect objects within the convex polygonal buffer region and may configure the vehicle to attempt to stop or otherwise perform maneuvers based on detecting an object within the convex polygonal buffer region. In various examples, the vehicle computing system may perform the convex polygonal buffer region determination operations of the process 100 and/or to substantially continuously determine updated convex polygonal buffer regions using such operations to provide updated and current buffers for use in performing object detection and determining and performing collision avoidance maneuvers.

For example, referring again to example 132, the vehicle computing system may determine the convex polygonal buffer region 134 (and/or a sequence of one or more convex polygonal buffer region) and use data associated with the environment and/or the vehicle 106 to control the vehicle 106. For instance, the vehicle computing system may determine whether a predicted position of the object 110 is within the convex polygonal buffer region 134 and/or within a predicted position of the vehicle 106 (e.g., within a predicted bounding box representing the vehicle 106 at a predicted future position). If the object 110 is within the convex polygonal buffer region 134 and/or within a predicted position of the vehicle, the vehicle computing system may perform fine object detection operations to determine whether the object 110 is within another (e.g., more accurate) representation of a predicted region of travel. Alternatively, or in addition, the vehicle computing system may take steps to control the vehicle to stop or otherwise avoid the object 110 (e.g., before colliding with it).

FIGS. 2A-E illustrate an example of determining a convex polygonal buffer region in environment 200. Referring now to FIG. 2A, a vehicle 202 may be represented at a vehicle computing system by a bounding box 204 that includes data representing (e.g., approximate, estimated, and/or detected) boundaries and/or other data associated with the vehicle 202. The bounding box 204 may include data representing a discretized top-down view of the vehicle 202. Such data may include data that represents particular parts or aspects of the vehicle 202. For example, the bounding box 204 may include center rear axle data point 206 that may indicate the position of the center of the rear axle of the vehicle 202. In various examples, a vehicle trajectory for the vehicle 202 may be determined based on the center rear axle data point 206. The bounding box 204 may also include front left bounding box corner data point 208, front bounding box center data point 210, and front right bounding box corner data point 212. In various examples, these data points may be used to indicate the position of the front bumper of the vehicle 202, specifically the left endpoint of the front bumper, the center of the front bumper, and the right endpoint of the front bumper, respectively, and may also be referred to as left front bumper endpoint 208, front bumper center point 210, and right front bumper endpoint 212, respectively.

A vehicle computing system may determine, based on a vehicle's trajectory, a predicted region of travel 214 for the vehicle 202 representing a portion of the environment 200 predicted to be traversed by the front bumper of the vehicle 202. In various examples, the vehicle computing system may determine a predicted position of the vehicle 202's front bumper (e.g., positions of data points 208, 210, and/or 212) over time and/or at one or more points along the trajectory as it travels through the environment 200 based on the vehicle 202's trajectory and its position in the environment 200 (e.g., as indicated by the center rear axle data point 206) to determine the predicted region of travel 214.

In examples, the width of the predicted region of travel 214 may be the width of the vehicle 202 (e.g., the width of the front bumper of the vehicle 202, for example as indicated by the left front bumper endpoint 208 and the right front bumper endpoint 212). Alternatively, the width of the predicted region of travel 214 may be different than the width of the vehicle 202. For example, the width of the predicted region of travel 214 may be wider than the width of the vehicle 202 to provide an increased margin of safety in determining a buffer region.

The length of the predicted region of travel 214 may be represented as the center curve 216 of the predicted region of travel 214. The center curve 216 may represent the path of the front bounding box center data point 210 as it follows the vehicle 202's trajectory, representing the position of the center of the front bumper of the vehicle 202 as the vehicle 202 travels along its trajectory in the environment 200. The center curve 216 may have a particular length that may be determined dynamically based on one or more of various criteria and/or may be a fixed and/or preconfigured value. For example, the length of the center curve 216 be determined based on a vehicle stopping distance (e.g., determined based on a trajectory and/or collision avoidance operation(s)), vehicle braking capabilities, vehicle velocity, vehicle direction, detected object parameters, and/or other parameters that may be associated with a vehicle that may be controlled along a trajectory in an environment that may contain one or more objects. In various examples, the center curve 216 of the predicted region of travel 214 may be set to a desired convex polygonal buffer region length. In particular examples, the center curve 216 may have a fixed length of a number of meters, such as 1.5 meters, three meters, six meters, etc.

In various examples, the path and position of the front bumper of the vehicle 202, as represented by the data points 208, 210, and/or 212, as it travels along the vehicle 202's trajectory may be determined based on the position of the center rear axle data point 206 as it travels along the vehicle 202's trajectory. For example, because the vehicle 202 may be a rigid body, the positions of the individual data points 208, 210, and 212 relative to the center rear axle data point 206 may be consistent. Therefore, the positions of the individual data points 208, 210, and 212 may be interpolated at any point in the predicted region of travel 214 based on the position of the center rear axle data point 206 in the vehicle 202's trajectory and/or other data associated with the bounding box 204 and/or the vehicle 202 (e.g., position, yaw, velocity of one or more data points, etc.).

In various examples, the positions of one or more other data points (e.g., front rear axle data point, vehicle center data point, etc.) may be used instead of, or in addition to, a center rear axle data point to interpolate a position of one or more of an endpoint and/or a center of a front bumper of a vehicle or any other data point that may be used in the operations herein. The data point(s) used may be associated with one or more particular components of a vehicle. The data point(s) used may also, or instead, vary depending on characteristic and/or parameters of the vehicle (e.g., at a particular point in time and/or at a particular location). For example, if the vehicle 202 is operating in reverse, a front rear axle data point may be used to determine individual data points corresponding to the vehicle 202's rear bumper, that may in turn be used to determine a predicted region of travel and/or a convex polygonal buffer region behind the vehicle.

In various examples, the one or more data points used to interpolate a position of one or more other points used to determine a predict regions of travel for a vehicle may be based on a vehicle trajectory. For example, where the vehicle 202's trajectory is based on the center rear axle data point 206, the vehicle computing system may use the center rear axle data point 206 to determine the individual data points 208, 210, and 212. Alternatively, where the vehicle 202's trajectory is based on the center front bumper data point 210, the vehicle computing system may use the center front bumper data point 210 to determine the individual data points 208 and 212. In other alternatives, where the vehicle 202's trajectory is based on the one or more other data points, the vehicle computing system may use such one or more other data points to determine the individual data points 208, 210, and 212.

Figure 2B:
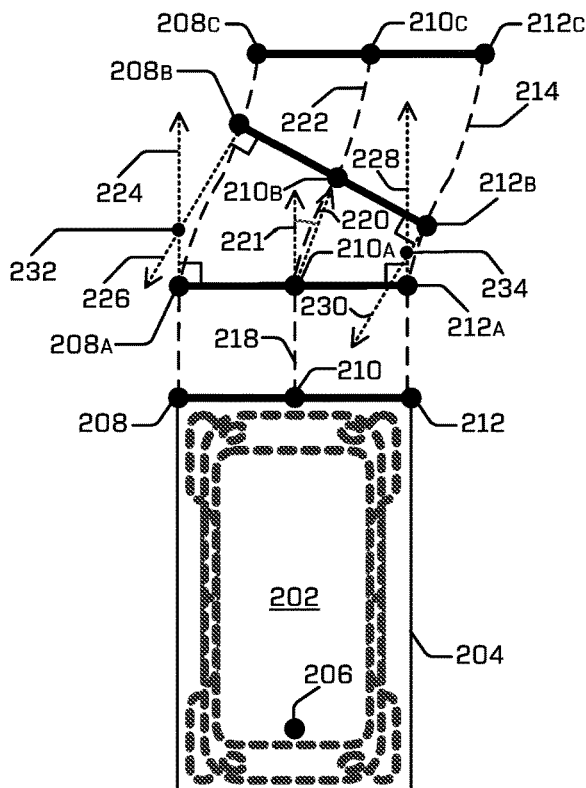

Referring now to FIG. 2B, the center curve 216 shown in FIG. 2A may be divided into three segments 218, 220, and 222. The individual segments 218, 220, and 222 may be of equal length in various examples. For example, where the center curve 216 may have a length 1.5 meters, the segments 218, 220, and 222 may have individual lengths of 0.5 meters; where the center curve 216 may have a length three meters, the segments 218, 220, and 222 may have individual lengths of one meter; where the center curve 216 may have a length six meters, the segments 218, 220, and 222 may have individual lengths of two meters; etc.

The vehicle computing system may determine a predicted position of the vehicle 202's front bumper for the individual segments 218, 220, and 222. For example, where the initial position of the front bumper of the vehicle 202 is indicated by the left front bumper endpoint 208, front bumper center point 210, and right front bumper endpoint 212 (and the emphasized line joining these points in the figure), the predicted position of the vehicle 202's front bumper after traveling along the segment 218 may be indicated by left front bumper endpoint 208a, front bumper center point 210a, and right front bumper endpoint 212a (and the emphasized line joining these points in the figure). The data points 208a, 210a, and 212a may be interpolated from the predicted position of one or more other data points associated with the vehicle 202 and/or the bounding box 204 after traveling along the segment 218, such as the center rear axle data point 206.

Similarly, the predicted position of the vehicle 202's front bumper after traveling along the segment 220 may be indicated by left front bumper endpoint 208b, front bumper center point 210b, and right front bumper endpoint 212b (and the emphasized line joining these points in the figure), and may be determined using interpolation from the predicted position of one or more other data points associated with the vehicle 202 and/or the bounding box 204 after traveling along the segment 218 as described herein. Likewise, the predicted position of the vehicle 202's front bumper after traveling along the segment 222 may be indicated by left front bumper endpoint 208c, front bumper center point 210c, and right front bumper endpoint 212c (and the emphasized line joining these points in the figure), and may be determined using interpolation from the predicted position of one or more other data points associated with the vehicle 202 and/or the bounding box 204 after traveling along the segment 222 as described herein.

Using the initial bumper position and the predicted bumper positions for the segments 218, 220, and 222, buffer section polygons may be determined for the individual segments. In various examples, tangent vectors may be determined for the individual endpoints of the bumper positions. Such tangent vectors may represent a vector originating at a bumper endpoint and extending tangent to a predicted region of travel (e.g., perpendicular to the position of the associated bumper). For example, a tangent vector 224 for the left front bumper endpoint 208$a$ associated with segment 218 may extend tangent to the predicted region of travel 214 towards segment 220. Likewise, a tangent vector 226 for the left front bumper endpoint 208$b$ associated with segment 220 may extend tangent to the predicted region of travel 214 towards segment 218. Similarly, a tangent vector 228 for the right front bumper endpoint 212$a$ associated with segment 218 may extend tangent to the predicted region of travel 214 towards segment 220, while a tangent vector 230 for the right front bumper endpoint 212$b$ associated with segment 220 may extend tangent to the predicted region of travel 214 towards segment 218.

In various examples, intersections of tangent vectors that extend outside of a predicted region of travel may be used to determine a vertex of a buffer section polygon, while intersections of tangent vectors that extend inside of a predicted region of travel may be disregarded as potential vertices in favor of using a line between the associated endpoints as a polygon edge. For example, tangent vectors 224 and 226 extend outwards from the predicted region of travel 214, intersecting at intersection 232, which necessarily lies outside of the predicted region of travel 214. Tangent vectors 228 and 230 extend into the predicted region of travel 214, intersecting at intersection 234, which necessarily lies inside of the predicted region of travel 214. Therefore, the intersection 232 may be used as a vertex for the polygon determined for segment 220, while the intersection 234 may not be used as a vertex for the polygon determined for segment 220. Instead, a line between the neighboring endpoints 212$a$ and 212$b$ may be used as an edge of the polygon determined for segment 220. Similar determinations may be made for the individual bumper positions associated with the segments 218 and 222.

Alternatively, or in addition, a predicted direction of a turn of the vehicle 202 for a segment may be used to determine whether to use a vector intersection as a vertex or not. For example, the angle 221 (e.g. between the vector representing the direction of travel according to the trajectory and a vector normal to the front bumper position represented by points 208$a$, 210$a$, and 212$a$) may indicate the direction of turn associated with the segment 220 (e.g., towards the right). The vehicle computing device may determine whether the angle 221 meets or exceeds a threshold (e.g., representing a turn that is sufficiently greater than traveling in a straight line) and, if so, may determine whether the angle is positive or negative. If the threshold is met and the angle is negative relative to bumper position normal, as is angle 221, the vehicle computing system may determine to retain the vector intersection to the left of the angle (intersection 232) as a vertex and discard the intersection to the right of the angle (intersection 234), and vice versa (as illustrated by resulting polygon 240 illustrated in FIG. 2C). In other words, for a right turn, the vehicle computing system may retain intersections to the left of the center curve as vertices and discard intersections to the right of the center curve, instead directly connecting the endpoints on the right of the curve, while for a left turn, the vehicle computing system may retain intersections to the right of the center curve as vertices and discard intersections to the left of the center curve, instead directly connecting the endpoints on the left of the curve.

Referring now to FIG. 2C, the results of such determinations may provide polygons 236, 238, and 240. As illustrated in this figure, the intersection 232 is used as a vertex of the polygon 238 determined for segment 220, while intersection 234 was not used.

In various examples, the following equations may be used to determine intersections such as intersections 232 and 234. A point $q_0$ (e.g., front bumper endpoint 208$a$) that may be a distance a from a point $p_0$ (e.g., center rear axle data point 206 after travel along segment 218) along the direction of a vector to may be defined as:

$$q_0 = p_0 + at_0 \tag{1}$$

while a point $q_1$ (e.g., front bumper endpoint 208$b$) that may be a distance b from a point $p_1$ (e.g., center rear axle data point 206 after travel along segment 220) along the direction of a vector $t_1$ may be defined as:

$$q_1 = p_1 + bt_1 \tag{2}$$

The intersection of the lines given by equations (1) and (2) may be determined using equation (3):

$$p_0 + at_0 = p_1 + bt_1 \tag{3}$$

The location of the intersection point may be indicated by [a, b], which may be determined by rearranging equation (3) into equation (4):

$$[t_0 - t_1]\begin{bmatrix} a \\ b \end{bmatrix} = p_1 - p_0 \tag{4}$$

Equation (4) may be solved (e.g., using Cramer's rule) to determine a and b using equations (5) and (6):

$$a = \det([p_1 - p_0 - t_1])/\det([t_0 - t_1]) \tag{5}$$

$$b = \det([t_0 - p_1 - p_0])/\det([t_0 - t_1]) \tag{6}$$

Thus, these equations illustrate an example technique of determining an intersection point a, b of the tangent vectors associated with the points $q_0$ and $q_1$ may be determined.

In various examples, the following equations may be used to determine tangent vectors for bumper endpoints, such as tangent vector 224 for left front bumper endpoint 208$a$, tangent vector 226 for left front bumper endpoint 208$b$, tangent vector 228 for right front bumper endpoint 212$a$, and/or tangent vector 228 for right front bumper endpoint 212$b$.

For a particular front bumper endpoint P at a position (e.g., in smooth frame) of $r_p$, a tangent vector that may be tangent to the path traversed by the point P at any given time may be defined as:

$$\frac{dr_p}{ds} = \frac{dr_p}{dt}\frac{dt}{ds} = \frac{dv_p}{v_x} \tag{7}$$

Where t is time, s is a length, $v_p$ is the velocity of P, and $v_x$ is the longitudinal velocity of the associated vehicle as it is traversing a trajectory. The body-fixed x and y directions of a vehicle, such as the vehicle 202, may be defined as vectors $\hat{i}'$ and $\hat{j}'$, with velocity P described as:

$$v_p = v_o + v_{p/o} \tag{8}$$

$$v_p = v_x \hat{i}' + \omega \times r_{p/o} \tag{9}$$

$$v_p = \left(v_x - \frac{d\theta}{dt}\frac{w}{2}\right)\hat{i}' + \frac{d\theta}{dt}l\hat{j}' \tag{10}$$

where $\theta$ may be a yaw angle of the vehicle, w may be the width of the vehicle, l may be a distance between an origin O (e.g., of a planner) and the center of the vehicle's front bumper, and $\omega$ may be an angular rotation rate of the vehicle. In examples, the curvature as defined below in equation (11):

$$\kappa = \frac{d\theta}{ds} = \frac{d\theta}{dt}v_x \tag{11}$$

may be substituted into equation (10) to yield the expression for $v_p$ (e.g., expressed in the body-fixed frame) illustrated in equation (12):

$$[v_p]^B = \begin{bmatrix} v_x - \kappa v_x \frac{w}{2} \\ \kappa l v_x \end{bmatrix} \tag{12}$$

that, when scaled by $1/v_x$ gives equation (13):

$$\left[\frac{dr_p}{ds}\right]^B = v_p/v_x = \begin{bmatrix} 1 - \kappa \frac{w}{2} \\ \kappa l \end{bmatrix} \tag{13}$$

Rotating the vector of equation (13) into a smooth frame may provide the equation representing the tangent vector that may be tangent to the path traversed by the point P as:

$$\frac{dr_p}{ds} = R(\theta)\begin{bmatrix} 1 - \kappa \frac{w}{2} \\ \kappa d \end{bmatrix} \tag{14}$$

where:

$$R(\theta) = \begin{bmatrix} \cos(\theta) & -\sin(\theta) \\ \sin(\theta) & \cos(\theta) \end{bmatrix} \tag{15}$$

As may be appreciated from FIGS. 2B and 2C, tangent vectors associated with opposite endpoints of a predicted bumper position may extend in opposite directions, which may result in pentagonal polygons. For example, when a vector at an endpoint tangent to the predicted region of travel extends inwards towards the predicted region of travel, such as the tangent vector 228 of the right front bumper endpoint 212*a*, the tangent vector at the opposite endpoint may extend outwards from the predicted region of travel, such as the tangent vector 224 of the left front bumper endpoint 208*a*. According, a vertex for the associated polygon may be introduced on one side of the polygon and not another. Thus, such polygons may have five edges.

However, if on tangent vectors substantially extend either inwards toward or outwards from the predicted region of travel, the resulting polygon may be a rectangle. Where the resulting polygon is a rectangle, the operations to determine vector intersections may be unnecessary and therefore not be performed, saving computational resources. For example, when a vehicle is predicted to travel in a substantially straight line (e.g., based on the trajectory), the tangent vectors may be substantially parallel to the direction of travel and therefore to the longitudinal axis of the predicted region of travel, resulting in rectangular determined polygons. Referring again to FIG. 2B, as will be appreciated from tie figure, a tangent vector for the left front bumper endpoint 208*a* associated with segment 218 may extend tangent to the predicted region of travel 214 towards segment 218 substantially parallel to the predicted region of travel 214. Likewise, a tangent vector for the initial left front bumper endpoint 208 may extend tangent to the predicted region of travel 214 towards segment 218 substantially parallel to the predicted region of travel 214. In this case, as the tangent vectors substantially overlap, there may be no intersection to consider in determining the associated polygon, resulting a rectangular polygon, such as polygon 236 as illustrated in FIG. 2C.

Using the polygons 236, 238, and 240 as illustrated in FIG. 2C, the vehicle computing system may determine a convex polygonal buffer region. Referring now to FIG. 2D, the vehicle computing system of vehicle 202 may combine the polygons 236, 238, and 240 into aggregated or intermediate polygon 242. Tangent vectors may be determined for vertices of the intermediate polygon 242 based on the edges associated with the vertices (e.g., using techniques described herein). For example, as shown in this figure, the vehicle computing system may determine (e.g., two) tangent vectors for the individual vertices 232 (e.g., vectors 224 and 226 as described above), 246, 248, 250, and 252 (e.g., vertices not associated with front or rear corners of the predicted region of travel 214) based on the respective (e.g., two) edges associated with the individual vertex.

The vectors determined for the individual vertices 232, 246, 248, 250, and 252 may be evaluated to determine whether they are associated with a concave or convex vertex. In examples, the concave vertices are eliminated from the polygon while convex vertices are retained to determine the convex polygonal buffer region. For example, the individual vertices of the intermediate polygon 242 having vectors that extend inwards toward the predicted region of travel may be concave vertices and may be eliminated. Examples of such vertices in FIG. 2D include vertices 246, 248, and 250. Likewise, the individual vertices of the intermediate polygon 242 having vectors that extend outwards away from the predicted region of travel may be convex vertices and may be retained. Examples of such vertices in FIG. 2D include vertices 232 and 252.

Figure 2E:
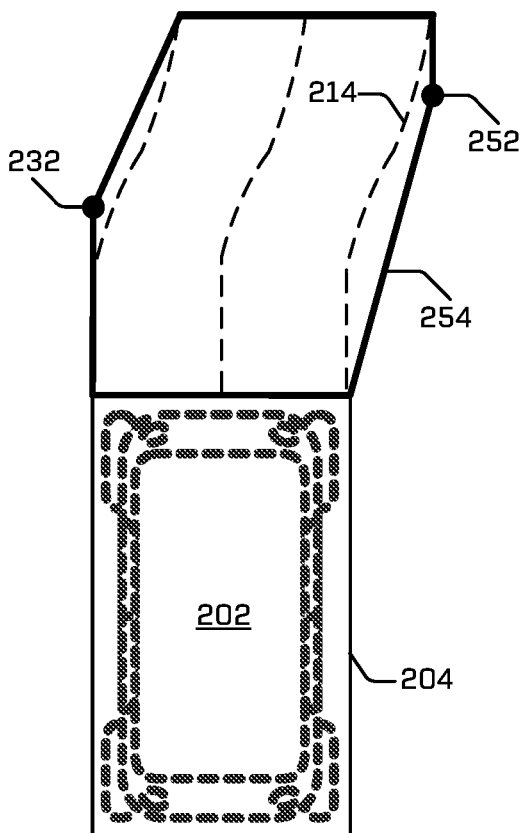

The vehicle computing system may use the retained vertices to determine the convex polygonal buffer region. Referring now to FIG. 2E, the vehicle computing system of vehicle 202 may determine the convex polygonal buffer region 254 by connecting edges between the retained vertices from the intermediate polygon 242, including the vertices 232 and 252. As can be seen in this figure, the eliminated vertices 246, 248, and 250 are not used to determine the convex polygonal buffer region 254.

By eliminating concave vertices while retaining convex vertices to determine a convex polygonal buffer region, the vehicle computing system may ensure that the entirety of a predicted region of travel is captured within the resulting convex polygonal buffer region.

The vehicle computing system of the vehicle 202 may use the convex polygonal buffer region 254 for performing object detection and/or determining and/or performing collision avoidance maneuvers as described herein. For example, the vehicle computing system may perform object detection within one or more convex polygonal buffer regions as a vehicle traverses a vehicle trajectory to determine whether an object in the predicted region of travel represents a potential obstacle. Alternatively, or in addition, the vehicle computing system may use one or more convex polygonal buffer regions in determining a collision avoidance trajectory (e.g., determined in response to detecting an obstacle) to configure the vehicle to attempt to stop or otherwise maneuver around an obstacle.

Figure 3:
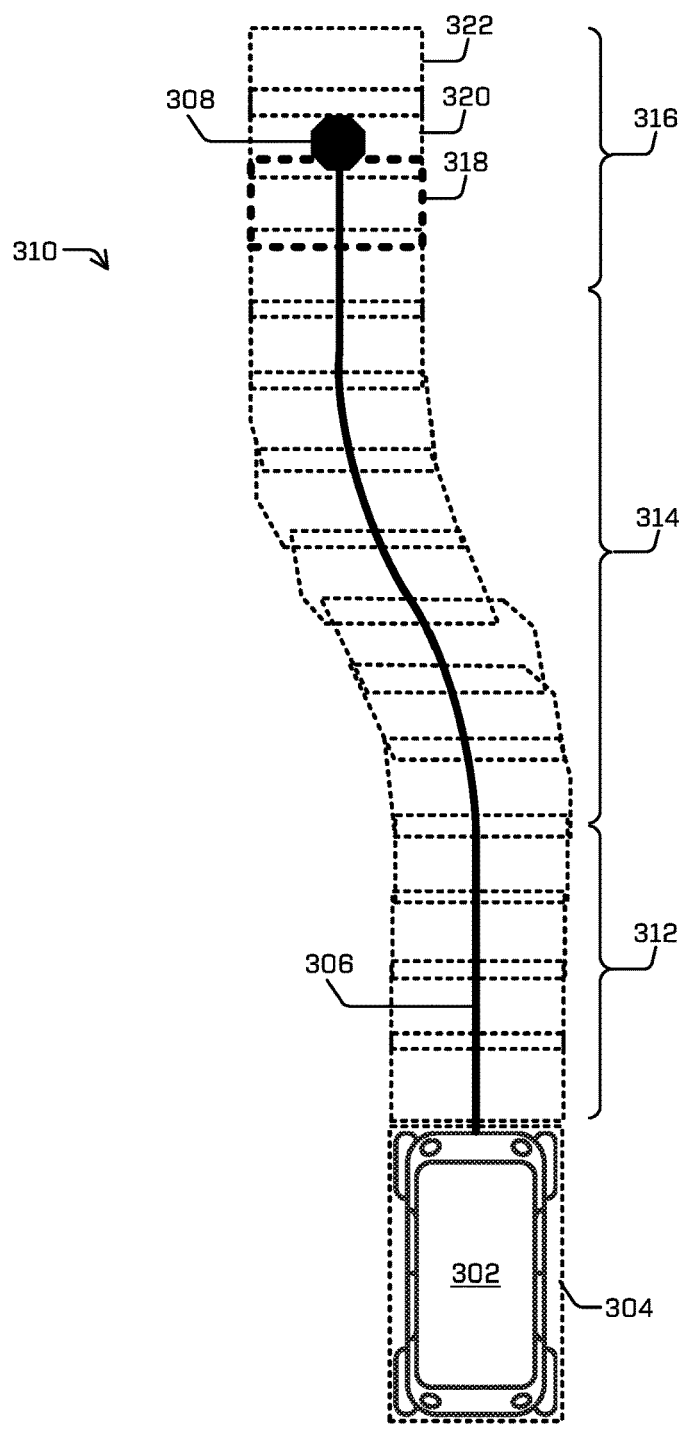
FIG. 3 depicts block diagrams representing an example vehicle, environment, regions, and data points that may be used for determining multiple sequential convex polygonal buffer regions, in accordance with examples of the disclosure.

FIG. 3 illustrates an example vehicle 302 and trajectory 306 and multiple example convex polygonal buffer regions 310 that may be determined by a vehicle computing system for the vehicle 302 as it traverses the trajectory 306. Based on the data associated with the bounding box 304 for the vehicle 302 (e.g., the data points in the bounding box 304 indicating front bumper endpoints, a front bumper center point, and/or a center point of the vehicle 302's rear axle) and the trajectory 306, the vehicle computing system may determine the individual buffer regions in the convex polygonal buffer regions 310. In examples, the vehicle computing system may repeatedly determine a buffer region as the vehicle 302 travels along the trajectory 306, resulting in the multiple convex polygonal buffer regions 310. As shown in this figure, individual buffer regions of the multiple convex polygonal buffer regions 310 may overlap. The multiple convex polygonal buffer regions 310 may represent an approximation of the path that the vehicle 302 (e.g., the front bumper of the vehicle 302) may follow over a period of time as it travels through the environment 300 based on the trajectory 306.

As shown in this figure, at sections 312 and 316 of the convex polygonal buffer regions 310, where the vehicle 302 may be traveling in a substantially straight line, the determined buffer regions may be rectangles. At section 314, where the trajectory causes the vehicle 302 to travel along a curve, the determined buffer regions may be polygons having five or more edges, determined, for example, based on the techniques described herein.

The vehicle computing system may determine buffer regions beyond the trajectory, for example, to provide additional space for stopping the vehicle 302 in the event an obstacle is detected. The trajectory 306 may include a stopping point 308 that serves as the terminal point of the trajectory. The buffer region 318 (emphasized in this figure) may be the final trajectory-based buffer region providing a buffer to ensure that the vehicle 302 detects objects up to the stopping point 308.

In various examples, the vehicle computing system may continue to determine buffer regions for portions of the environment beyond a stopping point for terminal use in collision avoidance operations. For example, the vehicle computing system may determine the buffer regions 320 and 322 that extend past the stopping point 308 so that such buffer regions may be available for use in detecting objects that may lie beyond the stopping point 308 but may still represent potential collision hazards for the vehicle 302.

Because the trajectory 306 has ended at stopping point 308, the vehicle computing system may assume a constant continuing trajectory of the same curvature as the trajectory 306 in determining buffer regions beyond the stopping point. For example, because the trajectory 306 was a substantially straight line at the stopping point 308, the vehicle computing system may use a substantially straight line as trajectory data, along with bounding box data, to determine the buffer regions 320 and 322. In examples where the trajectory was curving at the stopping point, the vehicle computing system may use a line having substantially the same curvature as the trajectory at the stopping point for trajectory data, along with bounding box data, to determine such buffer regions.

By using a sequence of buffers such as buffers 310 that capture the entirety of a region of predicted travel and extend beyond the path of the trajectory 306, the systems and techniques described herein may increase the safety of operating the 302 vehicle in the environment 300. For example, a vehicle computing system may repeatedly (e.g., substantially continuously) perform an object detection for individual determined convex polygonal buffer regions to determine whether an obstacle is within, or predicted to be within, a buffer region and, if so, take one or more actions to avoid a collision with the detected obstacle. For instance, a vehicle computing system may determine whether a bounding box representing a predicted position of an object in the environment overlaps with a determined convex polygonal buffer region and take responsive actions based on this determination. A vehicle computing system may also, or instead, determine whether a bounding box representing a predicted position of an object in the environment overlaps with a predicted bounding box of the vehicle and take responsive actions based on this determination. In some examples, an overlap of a predicted bounding box of the vehicle and a bounding box of a predicted position of an object in the environment may indicate a more severe potential collision risk than an overlap of a determined convex polygonal buffer region and a bounding box of a predicted position of an object in the environment. The one or more actions that may be taken by a vehicle computing system may be based on this severity of the potential collision risk.

In examples, a vehicle computing system may initially perform a coarse collision check to determine whether a predicted position of an object in the environment overlaps with a determined convex polygonal buffer region. If not, no responsive action may be taken. However, if a predicted position of an object in the environment overlaps with a determined convex polygonal buffer region, the vehicle computing system may then perform a fine collision check to determine whether the predicted position of the object in the environment overlaps with a predicted bounding box of the vehicle for the vehicle's position at the time at which it will occupy the region encompassed by the determined convex polygonal buffer region. For example, the vehicle computing system may use an intermediate polygon, such as intermediate polygon 242, to determine more precisely whether the predicted position of the object in the environment overlaps with a predicted bounding box of the vehicle for the vehicle's position at the time at which it will occupy the region encompassed by the determined convex polygonal buffer region. Because using a more complex polygon, such as an intermediate polygon, for object detection may be more computationally intensive, computational resources may be saved by initially using the simpler convex polygonal buffer region for coarse object detection and/or collision checking before performing a more resource intensive fine collision check or object detection. Furthermore, because the convex polygonal buffer region encompasses an area that includes at least that captured within an intermediate polygon, any object within an intermediate polygon may necessarily be within a convex polygonal buffer region, thereby ensuring that such objects will be detected.

Similarly, because the determined convex polygonal buffer regions may encompass a region that is larger than that occupied by a vehicle when it traverses that region, predicted position of objects in the environment may fall within the determined convex polygonal buffer region while not necessarily intersecting with the predicted bounding box of the vehicle for the vehicle's position at the time at which it will occupy the region encompassed by the determined convex polygonal buffer region. The disclosed systems and methods allow the vehicle computing system to avoid the more computationally intensive operations of determining whether the predicted position of the object in the environment overlaps with a predicted bounding box of the vehicle for the vehicle's position if the predicted position of the object does not overlap with at least one determined convex polygonal buffer region.

FIG. 4 depicts a block diagram of an example system 400 for implementing the techniques described herein. In at least one example, the system 400 can include a vehicle 402. The vehicle 402 can include a vehicle computing system or device 404 that may function as and/or perform the functions of a vehicle controller for the vehicle 402. The vehicle 402 can also include one or more sensor systems 406, one or more emitters 408, one or more communication connections 410, at least one direct connection 412, and one or more drive systems 414.

The vehicle computing device 404 can include one or more processors 416 and memory 418 communicatively coupled with the one or more processors 416. In the illustrated example, the vehicle 402 is an autonomous vehicle; however, the vehicle 402 could be any other type of vehicle. In the illustrated example, the memory 418 of the vehicle computing device 404 stores a localization component 420, a perception component 422, a planning component 424, one or more system controllers 426, one or more maps 428, a prediction component 430, and one or more convex polygonal buffer determination components 432. Though depicted in FIG. 4 as residing in memory 418 for illustrative purposes, it is contemplated that each of the localization component 420, the perception component 422, the planning component 424, the one or more system controllers 426, the one or more maps 428, the prediction component 430, and the one or more convex polygonal buffer determination components 432 can additionally, or alternatively, be accessible to the vehicle 402 (e.g., stored remotely). Furthermore, the convex polygonal buffer determination component(s) 432 may be a component of and/or associated with the panning component 424.

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory and/or for generating map data, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 422 can provide processed sensor data that indicates one or more characteristics associated with a detected entity (e.g., a tracked object) and/or the environment in which the entity is positioned. The perception component 422 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 424 can determine a path for the vehicle 402 to follow to traverse through an environment. In examples, the planning component 424 can determine various routes and trajectories and various levels of detail. For example, the planning component 424 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate. The planning component 424 may also, or instead, include one or more convex polygonal buffer determination components 432 that it may use to determine buffers to use for object detection and collision avoidance operations and/or instructions used to control the vehicle 402 as it follow a trajectory.

In at least one example, the vehicle computing device 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

The memory 418 can further include one or more maps 428 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 428 can include at least one map (e.g., images and/or a mesh). In some examples, the vehicle 402 can be controlled based at least in part on the maps 428. That is, the maps 428 can be used in connection with the localization component 420, the perception component 422, and/or the planning component 424 to determine a location of the vehicle 402, identify objects in an environment, and/or generate routes and/or trajectories to navigate within an environment.

In some examples, the one or more maps 428 can be stored on a remote computing device(s) (such as the computing device(s) 442) accessible via network(s) 440. In some examples, multiple maps 428 can be stored based on, for example, a characteristic (e.g., type of entity, time of day, day of week, season of the year, etc.). Storing multiple maps 428 can have similar memory requirements but increase the speed at which data in a map can be accessed.

In general, the prediction component 430 can generate predicted trajectories of objects in an environment. For example, the prediction component 430 can generate one or more predicted trajectories for vehicles, pedestrians, animals, and the like within a threshold distance from the vehicle 402. In some instances, the prediction component 430 can measure a trace of an object and generate a trajectory for the object based on observed and predicted behavior. The prediction component 430 may also, or instead, include one or more convex polygonal buffer determination components 432 that it may use to determine buffers based on a predicted trajectory.

In some instances, aspects of some or all of the components discussed herein can include any models, algorithms, and/or machine learning algorithms. For example, in some instances, the components in the memory 418 (and the memory 446, discussed below) can be implemented as a neural network. For instance, the memory 418 may include a deep tracking network that may be configured with a convolutional neural network (CNN). The CNN may include one or more convolution/deconvolution layers. Alternatively, or in addition, the one or more convex polygonal buffer determination components 432 may include a CNN that may perform operations as described herein.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 406 can include multiple instances of each of these or other types of sensors. For instance, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via the one or more networks 440, to the one or more computing device(s) at a particular frequency, after a lapse of a predetermined period of time, in near real-time, etc.

The vehicle 402 can also include one or more emitters 408 for emitting light (visible and/or non-visible) and/or sound. The emitter(s) 408 in an example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In some examples, the vehicle 402 can send sensor data, audio data, collision data, and/or other types of data to one or more computing device(s) 442 via the network(s) 440. In some examples, the vehicle 402 can send raw sensor data to the computing device(s) 442. In other examples, the vehicle 402 can send processed sensor data and/or representations of sensor data (e.g., multichannel data structures representing sensor data) to the computing device(s) 442. In some examples, the vehicle 402 can send sensor data to the computing device(s) 442 at a particular frequency, after a lapse of a predetermined period of time, in near real-time, etc. In some cases, the vehicle 402 can send sensor data (raw or processed) to the computing device(s) 442 as one or more log files.

The computing device(s) 442 can include processor(s) 444 and a memory 446 storing one or more perception components 448, planning components 450, and/or convex polygonal buffer determination components 452. In some instances, the one or more convex polygonal buffer determination components 452 can substantially correspond the one or more convex polygonal buffer determination components 432 and can include substantially similar functionality. In some instances, the perception component 448 can substantially correspond to the perception component 422 and can include substantially similar functionality. In some instances, the planning component 450 can substantially correspond to the planning component 424 and can include substantially similar functionality.

The processor(s) 416 of the vehicle 402 and the processor(s) 444 of the computing device(s) 442 can be any suitable processor capable of executing instructions to process data and perform operations as described herein. By way of example and not limitation, the processor(s) 416 and 444 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 446 are examples of non-transitory computer-readable media. The memory 418 and 446 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 442 and/or components of the computing device(s) 442 can be associated with the vehicle 402. That is, the vehicle 402 can perform one or more of the functions associated with the computing device(s) 442, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a trajectory associated with a vehicle in an environment; determining a predicted region of travel for a front bumper of the vehicle based at least in part on the trajectory and a width of the vehicle; determining a plurality of segments along the trajectory; determining a plurality of polygons associated with the predicted region based at least in part on the plurality of segments; determining an intermediate polygon based at least in part on a union of the polygons; determining a convex polygonal buffer region encompassing the predicted region of travel based at least in part on the intermediate polygon; and controlling the vehicle based at least in part on the convex polygonal buffer region.

B: The system of paragraph A, wherein determining a polygon of the plurality of polygons comprises determining an intersection point between a first line tangent to the predicted region at a first segment of the plurality of segments and a second line tangent to the predicted region at a second segment of the plurality of segments.

C: The system of paragraph B, wherein determining the polygon is further based at least in part on a direction of a vehicle turn associated with a first segment of the plurality of segments.

D: The system of any of paragraphs A-C, wherein determining the convex polygonal buffer region comprises removing a concave vertex from the intermediate polygon.

E: The system of any of paragraphs A-D, wherein controlling the vehicle comprises performing one or more maneuvering operations to avoid an object detected within the convex polygonal buffer region.

F: One or more non-transitory computer-readable media storing instructions that, when executed by one or more processors, perform operations comprising: determining a predicted region of travel for a vehicle based at least in part on a vehicle trajectory; determining a plurality of polygons associated with the predicted region of travel; determining a convex polygonal buffer region encompassing the predicted region of travel based at least in part on the plurality of polygons; and outputting a signal comprising the convex polygonal buffer region.

G: The one or more non-transitory computer-readable media of paragraph F, wherein a length along the predicted region of travel is associated with a stopping point.

H: The one or more non-transitory computer-readable media of paragraphs F or G, wherein the operations further comprise controlling the vehicle based at least in part on the convex polygonal buffer region.

I: The one or more non-transitory computer-readable media of any of paragraphs F-H, wherein determining the plurality of polygons comprises: determining that a polygon of the plurality of polygons is not substantially rectangular; and determining, based at least in part on determining that the polygon are not substantially rectangular, a vertex of the polygon based at least in part on an intersection point of two subsequent tangent lines associated with the predicted region of travel.

J: The one or more non-transitory computer-readable media of paragraph I, wherein determining the polygon is further based at least in part a direction of a vehicle turn.

K: The one or more non-transitory computer-readable media of paragraph J, wherein determining the polygon is further based at least in part on excluding a vertex that is associated with a same direction as the vehicle turn.

L: The one or more non-transitory computer-readable media of any of paragraphs F-K, wherein determining the plurality of polygons comprises segmenting the predicted region of travel based at least in part on substantially equal length segments of a longitudinal center length along the predicted region of travel.

M: The one or more non-transitory computer-readable media of any of paragraphs F-L, wherein the operations further comprise detecting an object in an environment based at least in part on the convex polygonal buffer region.

N: The one or more non-transitory computer-readable media of paragraph M, wherein the operations further comprise: determining an intermediate polygon based No at least in part on a union of the plurality of polygons; and based at least in part on detecting the object based at least in part on the convex polygonal buffer region, detecting the object based at least in part on the intermediate polygon.

O: A method comprising: determining a predicted region of travel for a vehicle based at least in part on a vehicle trajectory; determining a plurality of polygons associated with the predicted region of travel; determining a convex polygonal buffer region encompassing the predicted region of travel based at least in part on the plurality of polygons; and controlling the vehicle based at least in part on the convex polygonal buffer region.

P: The method of paragraph O, wherein controlling the vehicle comprises initiating a vehicle stopping operation based at least in part on detecting an obstacle within the convex polygonal buffer region.

Q: The method of paragraph O or P, wherein controlling the vehicle comprises initiating a vehicle stopping operation before the vehicle enters the convex polygonal buffer region.

R: The method of any of paragraphs O-Q, wherein determining the plurality of polygons comprises determining a predicted vehicle position based at least in part on a predicted position of one or more data points associated with a component of the vehicle.

S: The method of any of paragraphs O-R, wherein determining the plurality of polygons is further based at least in part on one or more intersections of one or more tangent vectors associated with a predicted vehicle position.

T: The method of any of paragraph S, wherein determining the plurality of polygons is further based at least in part on whether the one or more tangent vectors extend inwards towards the predicted region of travel.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   receiving a trajectory associated with a vehicle in an environment;
   determining a predicted region of travel for a front bumper of the vehicle based at least in part on the trajectory and a width of the vehicle, the predicted region of travel being along a drivable surface in the environment;
   determining a set of points along the trajectory;
   determining, based on the set of points, a set of line segments, a line segment of the set of line segments having a width equal to the width of the vehicle, being normal to the trajectory, and passing through a point of the set of points;
   determining a plurality of polygons associated with the predicted region of travel, a polygon of the plurality of polygons defined by two sequential line segments of the set of line segments and four lines extending normal to the two sequential line segments, each line of the four lines passing through a different terminal node of the two sequential line segments;
   determining an intermediate polygon based at least in part on a union of the plurality of polygons;
   determining a convex polygonal buffer region encompassing the intermediate polygon; and
   controlling the vehicle based at least in part on the convex polygonal buffer region.

2. The system of claim 1, wherein determining the polygon of the plurality of polygons comprises determining an intersection point between a first line of the four lines associated with a first line segment of the two sequential line segments and a second line of the four lines associated with a second line segment of the two sequential line segments.

3. The system of claim 2, wherein determining the polygon is further based at least in part on a direction of a vehicle turn associated with the first line segment of the two sequential set of line segments.

4. The system of claim 1, wherein determining the convex polygonal buffer region comprises removing a concave vertex from the intermediate polygon.

5. The system of claim 1, wherein controlling the vehicle comprises performing one or more maneuvering operations to avoid an object detected within the convex polygonal buffer region.

6. One or more non-transitory computer-readable media storing instructions that, when executed by one or more processors, perform operations comprising:
   determining a predicted region of travel for a vehicle based at least in part on a vehicle trajectory, the predicted region of travel being along a drivable surface in an environment;
   determining, based on a set of points along the vehicle trajectory, a set of line segments, a line segment of the set of line segments having a width equal to a width of the vehicle, being normal to the vehicle trajectory, and passing through a point of the set of points;
   determining a plurality of polygons associated with the predicted region of travel, a polygon of the plurality of polygons defined by two sequential line segments of the set of line segments and four lines extending normal to the two sequential line segments, each line of the four lines passing through a different terminal node of the two sequential line segments;

determining a convex polygonal buffer region encompassing the predicted region of travel based at least in part on the plurality of polygons;

outputting a signal comprising the convex polygonal buffer region; and controlling the vehicle based at least in part on the convex polygonal buffer region.

7. The one or more non-transitory computer-readable media of claim 6, wherein the line segment of the set of line segments is associated with a stopping point.

8. The one or more non-transitory computer-readable media of claim 6, wherein determining the plurality of polygons comprises:

determining that the polygon of the plurality of polygons is not substantially rectangular; and determining, based at least in part on determining that the polygon is not substantially rectangular, a vertex of the polygon based at least in part on an intersection point of two subsequent tangent lines associated with the predicted region of travel.

9. The one or more non-transitory computer-readable media of claim 8, wherein determining the polygon is further based at least in part on a direction of a vehicle turn.

10. The one or more non-transitory computer-readable media of claim 6, wherein determining the convex polygonal buffer region comprises:

combining the plurality of polygons into a combined polygon;

removing a first vertex of the combined polygon associated with first outside edges of the combined polygon that extend outwards from the predicted region of travel; and retaining a second vertex of the combined polygon associated with second outside edges of the combined polygon that extend inwards towards the predicted region of travel.

11. The one or more non-transitory computer-readable media of claim 6, wherein individual line segments of the set of line segments are substantially equal length segments of a longitudinal center length along the predicted region of travel.

12. The one or more non-transitory computer-readable media of claim 6, wherein the operations further comprise detecting an object in the environment based at least in part on the convex polygonal buffer region.

13. The one or more non-transitory computer-readable media of claim 12, wherein the operations further comprise:

determining an intermediate polygon based at least in part on a union of the plurality of polygons; and based at least in part on detecting the object based at least in part on the convex polygonal buffer region, detecting the object based at least in part on the intermediate polygon.

14. A method comprising:

determining a predicted region of travel for a vehicle based at least in part on a vehicle trajectory, the predicted region of travel being along a drivable surface in an environment;

determining, based on a set of points along the vehicle trajectory, a set of line segments, a line segment of the set of line segments having a width equal to a width of the vehicle, being normal to the vehicle trajectory, and passing through a point of the set of points;

determining a plurality of polygons associated with the predicted region of travel, a polygon of the plurality of polygons defined by two sequential line segments of the set of line segments and four lines extending normal to the two sequential line segments, each line of the four lines passing through a different terminal node of the two sequential line segments;

determining a convex polygonal buffer region encompassing the predicted region of travel based at least in part on the plurality of polygons; and controlling the vehicle based at least in part on the convex polygonal buffer region.

15. The method of claim 14, wherein controlling the vehicle comprises initiating a vehicle stopping operation based at least in part on detecting an obstacle within the convex polygonal buffer region.

16. The method of claim 14, wherein controlling the vehicle comprises initiating a vehicle stopping operation before the vehicle enters the convex polygonal buffer region.

17. The method of claim 14, wherein determining the plurality of polygons comprises determining a predicted vehicle position based at least in part on a predicted position of one or more data points associated with a component of the vehicle.

18. The method of claim 14, wherein determining the plurality of polygons is further based at least in part on one or more intersections of one or more tangent vectors associated with a predicted vehicle position.

19. The method of claim 18, wherein determining the plurality of polygons is further based at least in part on whether the one or more tangent vectors extend inwards towards the predicted region of travel.

* * * * *